United States Patent [19]
Hardy et al.

[11] Patent Number: 4,788,439
[45] Date of Patent: Nov. 29, 1988

[54] MULTIPLE DETECTOR FOG SUPPRESSION AND EDGE ENHANCEMENT

[75] Inventors: Arthur H. Hardy, Santa Barbara; Leland V. Gardner, Buellton, both of Calif.

[73] Assignee: Santa Barbara Research Center, Goleta, Calif.

[21] Appl. No.: 11,472

[22] Filed: Feb. 5, 1987

[51] Int. Cl.⁴ .............................................. G01V 9/04
[52] U.S. Cl. ................................. 250/561; 250/222.1
[58] Field of Search ..................... 250/222.1, 221, 561; 340/555, 556, 557, 573, 567, 571; 356/4, 5

[56] References Cited

U.S. PATENT DOCUMENTS

| | | | |
|---|---|---|---|
| 3,444,544 | 5/1969 | Pearson et al. | 340/555 |
| 4,263,585 | 4/1981 | Schaefer | 340/567 |
| 4,479,053 | 10/1984 | Johnston | 340/555 |
| 4,617,463 | 10/1986 | Muirhead . | |
| 4,639,716 | 1/1987 | Payne | 340/571 |

Primary Examiner—David C. Nelms
Assistant Examiner—Jessie Ruoff
Attorney, Agent, or Firm—W. C. Schubert; V. G. Laslo; A. W. Karambelas

[57] ABSTRACT

A proximity sensing system and signal processing method are disclosed for detecting target objects from a movable vehicle while protecting against false target detection due to the presence of fog, clouds, or other aerosols. One or more target detectors are alternately disposed adjacent to one or more guard detectors so the edges of the fields of view are immediately adjacent. A collimated laser beam is projected away from the vehicle by a transmitter along an axis which intersects at an angle with the adjacent fields of view defining active areas in which the beam will be reflected from objects. Signals generated from any beam reflections to a target detector are made positive while signals generated by any beam reflections to a guard detector are made negative with respect to a threshold reference. The signals are summed in a differential amplifier and the resultant signal presented to a digital comparator. Signals produced by reflections from a solid object in a target detector field of view causing the comparator output to exceed a detection voltage threshold, indicate a true target. Signals produced by reflections of the beam into the target detector(s) and guard detector(s), from clouds or fog even if as strong as a solid object, are maintained below the detection voltage threshold. Large specular reflections, for example, from water, produce a similar result. The summing action steepens the slope of the summed signal produced when a target image moves onto the edge of a target detector element causing targets to be detected very near the edge of a target dectector active area, hence at near-constant range, irrespective of target reflectance.

16 Claims, 9 Drawing Sheets

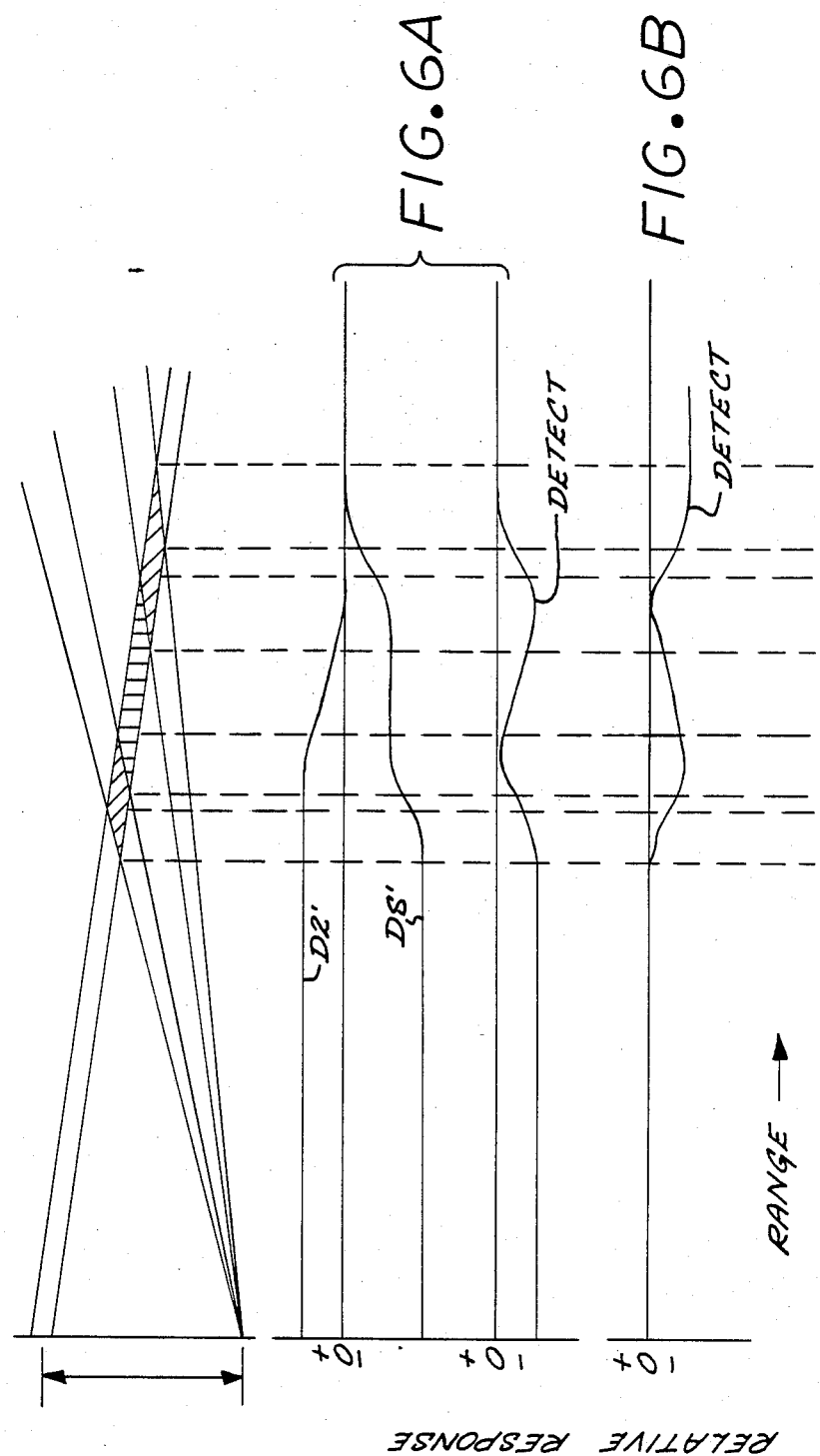

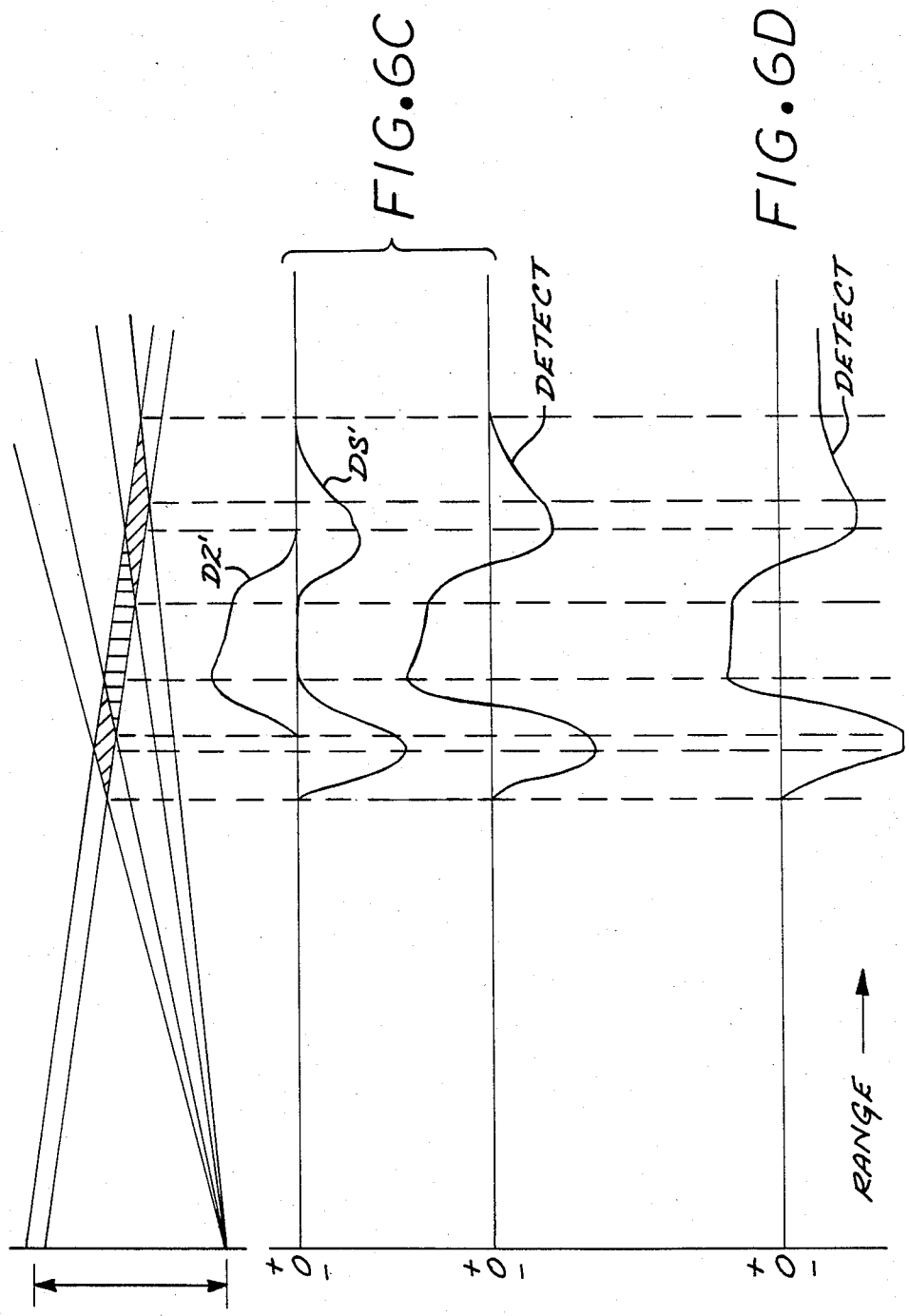

MULTIPLE DETECTOR FOG SUPPRESSION AND EDGE ENHANCEMENT

BACKGROUND OF THE INVENTION

The disclosed invention generally relates to optical proximity sensing systems, and is particularly directed to an optical proximity sensing system having a plurality of detectors having adjacent fields of view.

Optical sensing proximity systems are utilized, for example, in a movable vehicle, such as a missile, for detecting the presence of a target object which may be encountered while the vehicle is moving. Positive detection of a target object may be utilized for various purposes such as initiation of a predetermined process or maneuver. Generally, known optical sensing proximity systems include a transmitter having a transmit transducer, such as a laser beam, and a receiver having a receive transducer, such as an infrared detector. The transmitter and receiver typically also have respective processing circuitry. The transmitter and receiver are aligned so that the transmitter field of view and the receiver field of view overlap in a predetermined active region. If an object is located within the active region, the receiver provides an appropriate detection signal.

While the above described transmitter/receiver proximity system is fairly straightforward, actual use is not. Specifically, fog, smog, smoke dust, and other scattering and/or absorbing particulate matter (collectively "aerosol") in the atmosphere are known to present false alarms to optical proximity sensing systems. Further, such atmospheric conditions may obscure a target object.

Another consideration with known optical proximity sensing systems is their sensitivity to the reflectance of a target object. That is, a target object having a given reflectance will cause detection at a relatively different range than a target object having a greater or lesser reflectance.

U.S. Pat. No. 4,532,867, issued to Mitchell on Aug. 6, 1985, discloses a target detection system having a dual field of view. The Mitchell system dual field of view is intended to reduce the number of false alarms which would otherwise be generated by a single field of view system. However, it is believed that the Mitchell system may be susceptible to false alarms in an aerosol environment.

Briefly, the Mitchell system includes first and second sensing zones for first and second detectors, where the first sensing zone is closer to the detector carrying missile. The first and second detector outputs are amplified and provided to respective first and second peak hold circuits. The first peak hold circuit output is provided to a first comparator which has its other input coupled to a threshold reference. The second peak hold circuit output is provided to a second comparator which also receives the first peak hold circuit output. The outputs of the comparators are provided as inputs to an AND circuit which provides an output indicative of target detection.

The Mitchell system indicates the presence of a target when both of the following conditions are met: (a) the first detector output is greater than the second detector output, and (b) the first detector output is greater than the threshold reference.

In the presence of aerosol, the outputs of both detectors of the Mitchell system could be very close and false alarms would occur due to random noise so long as the first detector output exceeds the threshold reference.

SUMMARY OF THE INVENTION

It would therefore be an advantage to provide an optical proximity sensing system that does not suffer false alarms when entering or leaving an aerosol environment, such as a fog bank.

It would also be an advantage to provide an optical proximity sensing system which can detect an object target in the presence of aerosol in the atmosphere.

Another advantage would be to provide an optical proximity sensing system which provides for more consistent detection at the same range irrespective of varying target reflectances.

Another advantage would be to provide an optical proximity sensing system that is insensitive to sidelobes and secondary scattering.

Yet another advantage would be the elimination of responses to large signals from specular reflections outside the active range and field of view. Such reflections might be caused by water surfaces, windows or glossy metal surfaces.

The foregoing and other advantages and features are provided by an improved optical proximity sensing system which has protection against false target detection in aerosol environments such as fog or clouds, and provides target detection at a substantially constant range irrespective of target reflectance. The system has a well known, solid state laser transmitter, one or more target detectors, depending on the application, guard receivers alternating with target detectors, and electronics processing circuits for processing signals from the target and guard detectors. When false detection protection is desired for situations where the vehicle carrying the system may both enter or leave an aerosol environment, at least two guard detectors are used for each target receiver. Otherwise one guard detector may be used with each target detector.

A target detector is disposed adjacent to a guard detector so the edges of the fields of view are also immediately adjacent. The active areas wherein a target or aerosol reflection may originate are located at some distance from the vehicle carrying the system and are defined by the intersection of the transmitter beam and the detector fields of view. Within those areas, energy from the transmitter beam will be reflected to the detectors from a target and also from an aerosol background. A solid target will generally be smaller than an active area. An aerosol environment may be larger than an active area.

In the disclosed invention, the guard signals are processed with the target detector signals in a way to eliminate nearly all false detections resulting from aerosol reflections. Signals generated by a guard detector are made negative with respect to a threshold reference and then summed in a differential amplifier with positive signals produced by the target detector. The composite signal is presented to a digital comparator. A solid target will cause the comparator output to exceed a detection voltage threshold. Reflections from aerosols that alone would cause the target detector signal to exceed the threshold will be offset by signals due to aerosol reflections in the guard detectors, so the threshold will not be exceeded. Gain of the guard detectors is set equal to or near that of the target detector so that even under conditions where the target is immersed in fog or clouds, or a dynamic situation where the vehicle carrying the system is entering or leaving fog or clouds, there will be a low probability the threshold will be exceeded in the presence of such aerosols. Alternatively, the gain of the guard detectors may be set very high to further minimize false alarms.

Enhanced target detection at the edge of the field of view of the target detector results from the disclosed invention. Summing a positive target detector signal with a negative guard detector signal steepens and makes relatively constant the slope of the signal produced when a target image moves onto the surface of the target receiver detector. Because of this, a target will be detected very near the edge of the target detector field of view irrespective of the relative power of the target image. This results in detection of targets having different reflectances at essentially the same range from the vehicle.

BRIEF DESCRIPTION OF THE DRAWING

The advantages and features of the disclosed invention will readily be appreciated by persons skilled in the art from the following detailed description when read in conjunction with the drawing wherein:

FIGS. 6A–6D are diagrams schematically illustrating the outputs of the detectors of the optical proximity sensing system of FIG. 1 for different atmospheric conditions as a function of range (i.e., distance from the sensing system).

DETAILED DESCRIPTION OF THE DISCLOSURE

Figure 1:
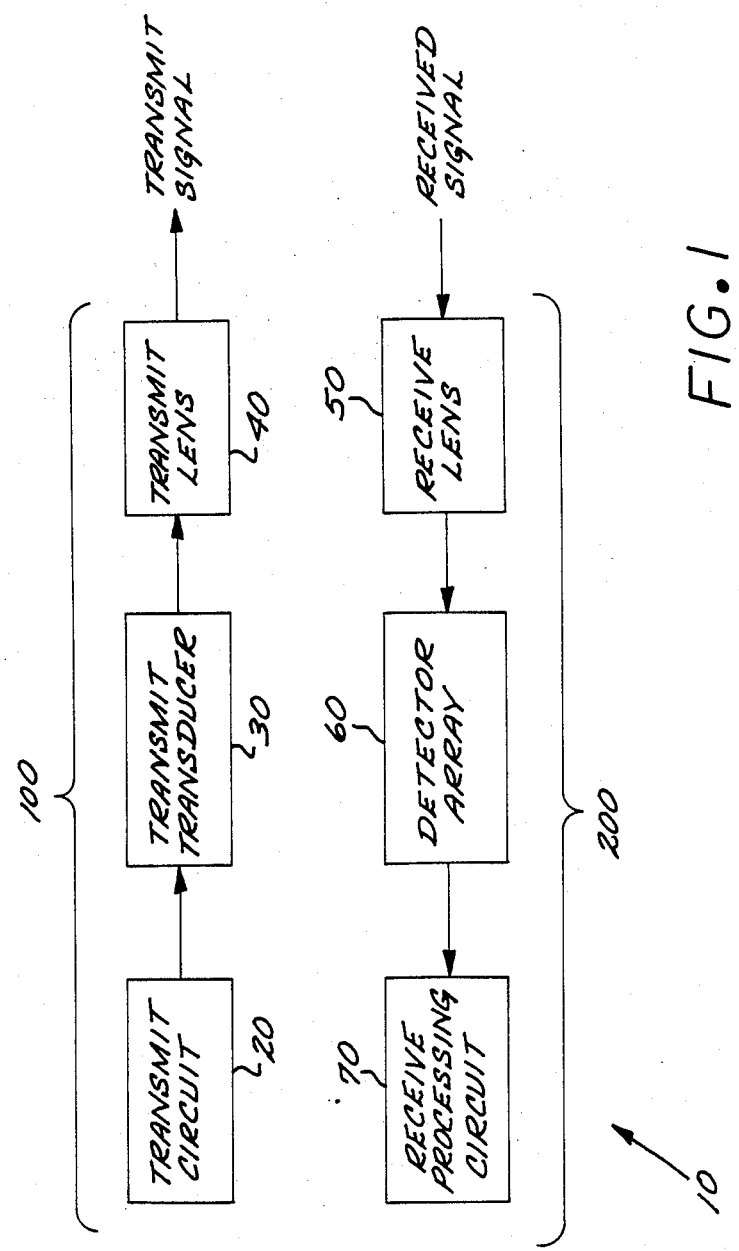
FIG. 1 is a block diagram of the disclosed optical proximity sensing system.

In the following detailed description and in the several figures of the drawing, like elements are identified with like reference numerals.

Also, since the following disclosure deals with airborne scattering and/or absorbing particulate matter (e.g., fog, smog, smoke, dust), reference to "aerosol" should be understood as encompassing such various airborne particulate matter.

Additionally, in the following disclosure, the results as described should be understood to depend upon fields of view being equal, one to the other, and amplifier gains being equal one to the other. Where inequality of fields of view or amplifier gain offer some advantage, a person skilled in the art may make appropriate modifications or adjustments.

Referring now to FIG. 1, illustrated therein is an optical proximity sensing system 10 which includes an optical transmitter 100 for providing a transmit signal. The transmitter 100 generally includes a transmit circuit 20 which controls an optical transmit transducer 30. The transmit transducer 30 provides an optical signal to a transmit lens system 40 which provides the optical transmit signal. Optical transmitters are well known and a suitable one may be utilized. Thus, for example, the optical transducer 30 may include a gallium arsenide laser diode which is pulsed to provide a pulsed optical transmit signal.

The proximity sensing system 10 further includes a receiver 200 which generally includes a receive optical lens system 50, an optical detector array 60, and a receive processing circuit 70. The optical detector array 60 includes at least two detector elements which by way of example may be monolithic solid state photodetectors, such as silicon photodiodes.

Figure 2:
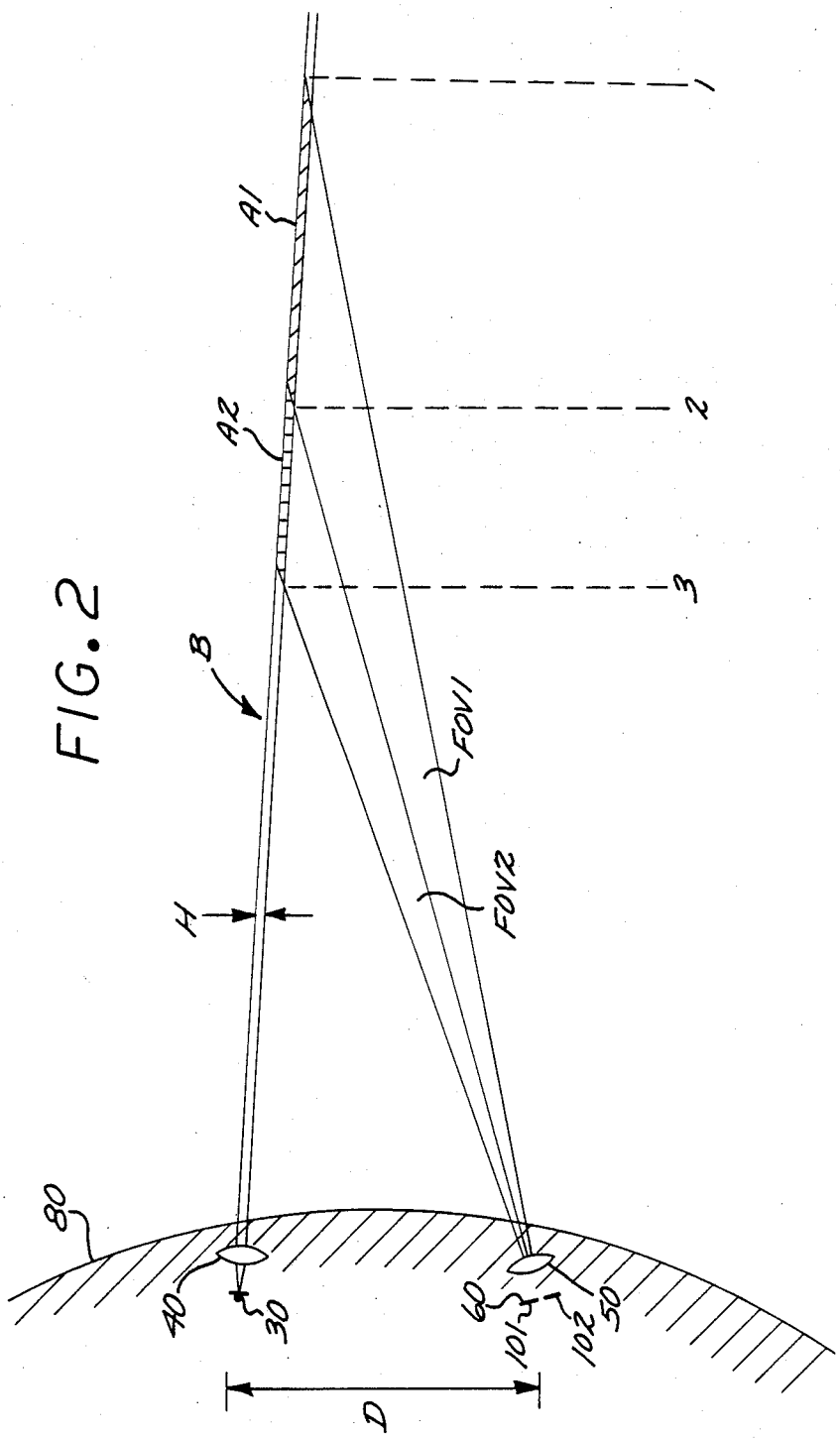
FIG. 2 is a schematic representation of the use of the disclosed optical proximity sensing system having two fields of view.

The proximity sensing system 10 may be carried on a movable vehicle, such as a missile, and FIG. 2 illustrates the application of the optical proximity sensing system 10 for a detector array 60 having two detector elements. The transmit transducer 30 and the transmit lens system 40 are suitably mounted in a missile 80 to provide a laser beam B as the transmit signal. For illustration purposes, the transmit lens system 40 is shown as a single lens, although it may be a multi-element lens. The laser beam B is directed away from the missile 80 and, as shown, may be a pencil beam that is collimated or essentially collimated. Preferably, the height H of the laser beam B is kept as small as possible.

The optical detector array 60 of the receiver 200 is mounted so that its two detectors 101, 102 are closely spaced and linearly aligned from top to bottom relative to the orientation of FIG. 2, with the detector 101 being at the top of the array and the detector 102 being at the bottom. For ease of reference, the detector 101 is to be called a guard detector 101 and the detector 102 is called a target detector 102. The center of the detector array 60 is located a distance D from the center of the emanating laser beam B.

The detectors 101, 102 respectively have associated fields of view FOV1, FOV2. The angular subtense of each of the fields of view are controlled by the sizes of the respective detectors and the receive lens system 50. The fields of view are inverted relative to the orientation of the associated detector elements since the receive lens system 50 inverts the image provided to the detector array 60. For illustration purposes, the receive lens system 50 is shown in FIG. 2 as a simple lens, although a multielement lens may be utilized.

The respective intersections of the fields of view FOV1, FOV2 with the laser beam B define the respective active regions for the guard detector 101 and the target detector 102. The active region for the guard detector 101 is shaded and identified as A1, and the active region for the target detector 102 is shaded and identified as A2.

Portions of the reflected energy which emanate from within the active regions A1, A2 provide returns to the guard detector 101 and the target detector 102. Ideally, the return to the guard detector 101 should only be due to reflections which emanate in the corresponding active region A1, and the return to the target detector 102 should only be due to reflections which emanate in the corresponding active region A2. However, neither the edges of the transmitter beam B nor the edges of the fields of view FOV1, FOV2 are as sharply defined as suggested by the schematic representation of FIG. 2. Fields of view FOV1, FOV2 have sidelobes of weak sensitivity and transmitter beam B has sidelobes of weak power that extend beyond the edges defining the main concentration. Sidelobes can be caused by diffraction, lens aberrations, component scattering or target second reflections. Such sidelobes of FOV1, for example, overlap active area A2 and sidelobes of FOV 2 overlap active area A1.

While the respective returns to the detectors 101 and 102 may include energy from an adjacent active area and may, thereby, create a small area of uncertainty as to which active area a target is in, the general condition will be that a target will present a strong return from the active area in which it is located. Such a target will usually reflect the transmitter beam to only one detector.

Figure 3:
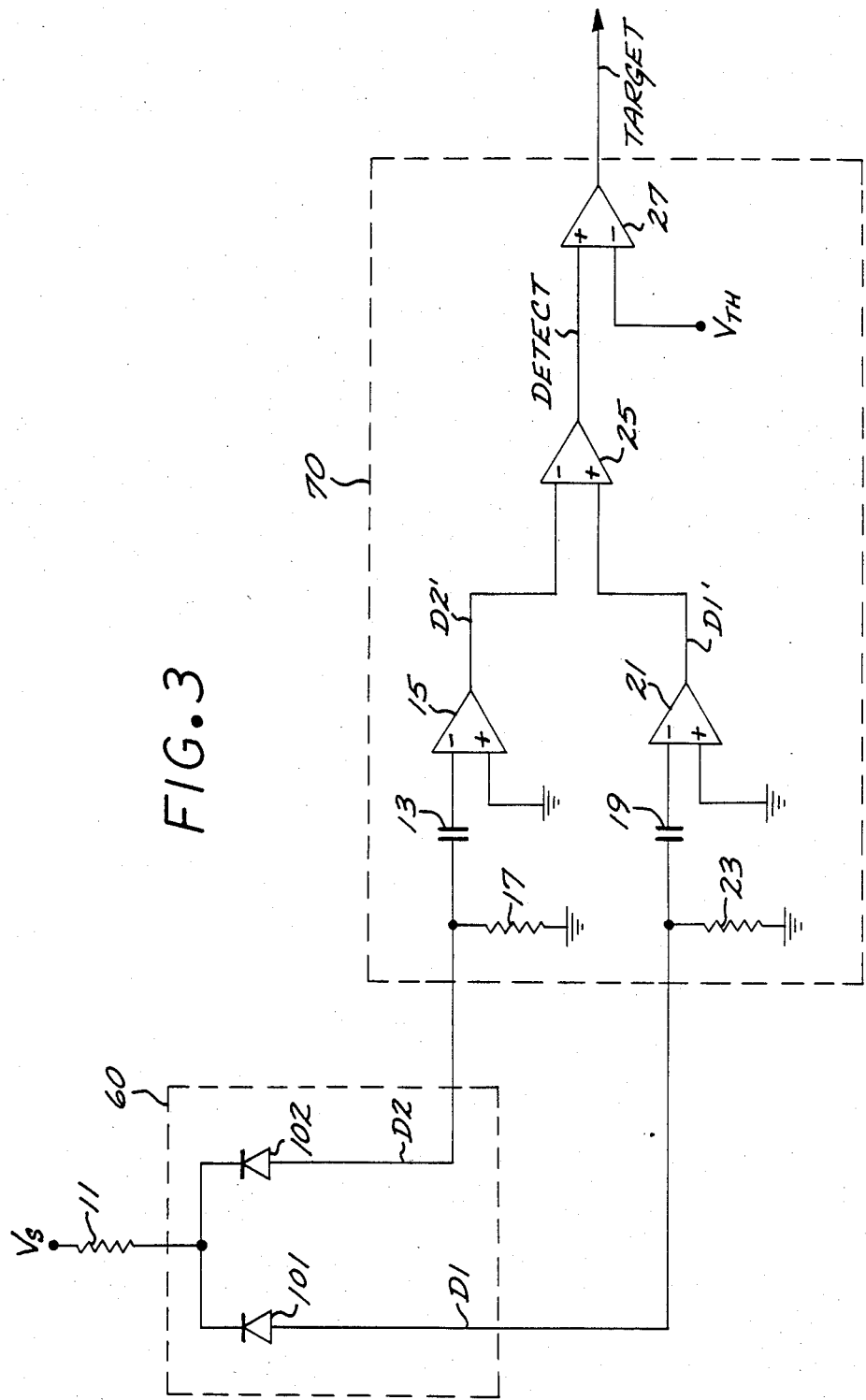
FIG. 3 is a schematic diagram of the detector array and receive processing circuit of the disclosed optical proximity sensing system of FIG. 1.

Referring now to FIG. 3 shown therein is a schematic diagram of the detector array 60 and the receive processing circuit 70 of the optical proximity sensing system 10 of FIG. 1 for a detector array 60 having two detector elements. The two detectors 101, 102 of detector array may be photodiodes and are shown as photodiodes. As is well known, a photodiode provides current conduction as a function of illumination intensity and area.

The cathodes of the detectors 101, 102 are connected together to one terminal of a biasing resistor 11 which has its other terminal coupled to a voltage source $V_s$. The anode of the detector 101 provides a detector output D1, and the anode of the detector 102 provides a detector output D2.

The anode of the detector 101 is coupled via an AC coupling capacitor 19 to the inverting input of a transimpedance amplifier 21. A load resistor 23 is coupled between the anode of the detector 101 and ground, and functions to allow the blocked DC signal to be coupled to ground.

The anode of the detector 102 is coupled via an AC coupling capacitor 13 to the inverting input of a transimpedance amplifier 15. A load resistor 17 is coupled between the anode of the detector 101 and ground, an functions to allow the blocked DC signal to be coupled to ground. For this discussion, the respective gains of the amplifiers 15, 21 are assumed to be unity. Other gains may be selected, depending on application.

The output of the transimpedance amplifier 15 is coupled to the inverting input of a differential amplifier 25, and the output of the transimpedance amplifier 21 is coupled to the non-inverting input of the differential amplifier 25. The output signal provided by the differential amplifier 25 represents the difference between (a) the amplified output of the target detector 102 and (b) the amplified output of the guard detector 101, and is identified as the signal DETECT. The signal DETECT may be expressed as follows:

DETECT=D2'−D1'  (Equation 1)

where D1' and D2' are amplified versions of the detector outputs D1 and D1 from the detectors 101, 102.

The DETECT signal from the differential amplifier 25 is provided to the non-inverting input of a digital comparator 27, which has its inverting input coupled to a threshold voltage $V_{TH}$. The digital comparator 27 provides an output signal TARGET which has logical levels. A high TARGET signal indicates that the optical sensing system 10 has determined the presence of an object target in the active region A2 of the target detector 102.

In operation, the TARGET signal goes high only when the DETECT signal exceeds a predetermined threshold VTH, which is a slightly positive reference voltage. Since the output of the guard detector 101 is subtracted from the output of the target detector 102, the DETECT signal will be positive only when the target detector output exceeds the guard detector output by an amount equal to the threshold $V_{TH}$.

Consider first the situation where both active regions A1, A2 are subject to the same or similar atmospheric conditions. For example, both may be subject to the presence of aerosol or the absence of aerosol. Under such similar conditions, the absence of a strong target return to either of the detectors 101, 102 results in very similar outputs by the guard detector 101 and the target detector 102. The resulting DETECT signal will therefore be close to zero and below the reference threshold $V_{TH}$.

Further considering the situation where both active regions A1, A2 are subject to the same or similar atmospheric conditions, the presence of a strong return from a target to one of the detectors 101, 102 results in the TARGET signal going high only when the strong target return is to the target detector 102. If the strong target return is to the guard detector 101, the resulting DETECT signal becomes negative and therefore the TARGET signal remains low. However, if the strong target return is to the target detector 102, the resulting DETECT signal becomes positive and exceeds the reference threshold $V_{TH}$.

Under the foregoing conditions where both active regions A1, A2 are subject to the same or similar atmospheric conditions, the optical proximity sensing system 10 with two detector elements is very resistant to false alarms. Such resistance to false alarms follows from the subtraction of the amplified output of the guard detector 101 from the amplified output of the target detector 102, which in essence provides for a variable threshold that must be exceeded by the amplified target detector output to allow the TARGET signal to go high. That variable threshold is the sum of the amplified guard detector output and the reference threshold $V_{TH}$.

Still referring to FIG. 2, consider next the condition where an aerosol bank extends from point 2 through and beyond point 1 in the active region A1 associated with the guard detector 101. Such condition would be encountered, for example, when the active regions A1, A2 are entering an aerosol bank. Without a strong target return to either of the detectors 101, 102, the DETECT signal will be negative and therefore the TARGET signal remains low. With a strong target return to the guard detector 101, the DETECT signal will also be negative and the TARGET signal remains low. With a strong target return from a solid target to the target detector .102, the DETECT signal will be positive and greater than the reference threshold $V_{TH}$. The TARGET signal will go high.

Under the foregoing condition where an aerosol bank extends from the active region A2 to far range, the optical proximity sensing system 10 having two detectors is resistant to false alarms as a result of the variable threshold provided by the output of the guard detector 101.

Consider next the condition where an aerosol bank extends from point 3 to point 2 in the active region A2 of the target detector 102. Such condition would be encountered, for example, when the active regions A1, A2 are leaving an aerosol bank. Without a strong target return to either of the detectors 101, 102, the DETECT signal will be positive since the target detector 102 is receiving an aerosol return while the guard detector 101 is not. Thus, a false alarm is possible. That possibility of false alarms is nearly eliminated by providing guard detectors on either side of a target detector. Such a three detector system is discussed in the following paragraphs relative to FIGS. 4 and 5.

It should be readily understood that the respective functions of the detectors 101, 102 may be interchanged so that the detector 101 is a target detector and the detector 102 is a guard detector. With such modification, the amplified output of the detector 102 would be subtracted from the amplified output of the detector 101. By analogy to the prior discussed system, locating the target detector on the far range side of the guard detector prevents false alarms for the condition where an aerosol bank extends from point 3 (near range) to point 1. However, false alarms are possible with the condition where an aerosol bank extends from the active region of the target detector to beyond point 1 (far range). That possibility of false alarms is substantially eliminated by providing guard detectors on either side of a target detector as discussed below relative to FIGS. 4 and 5.

Figure 4:
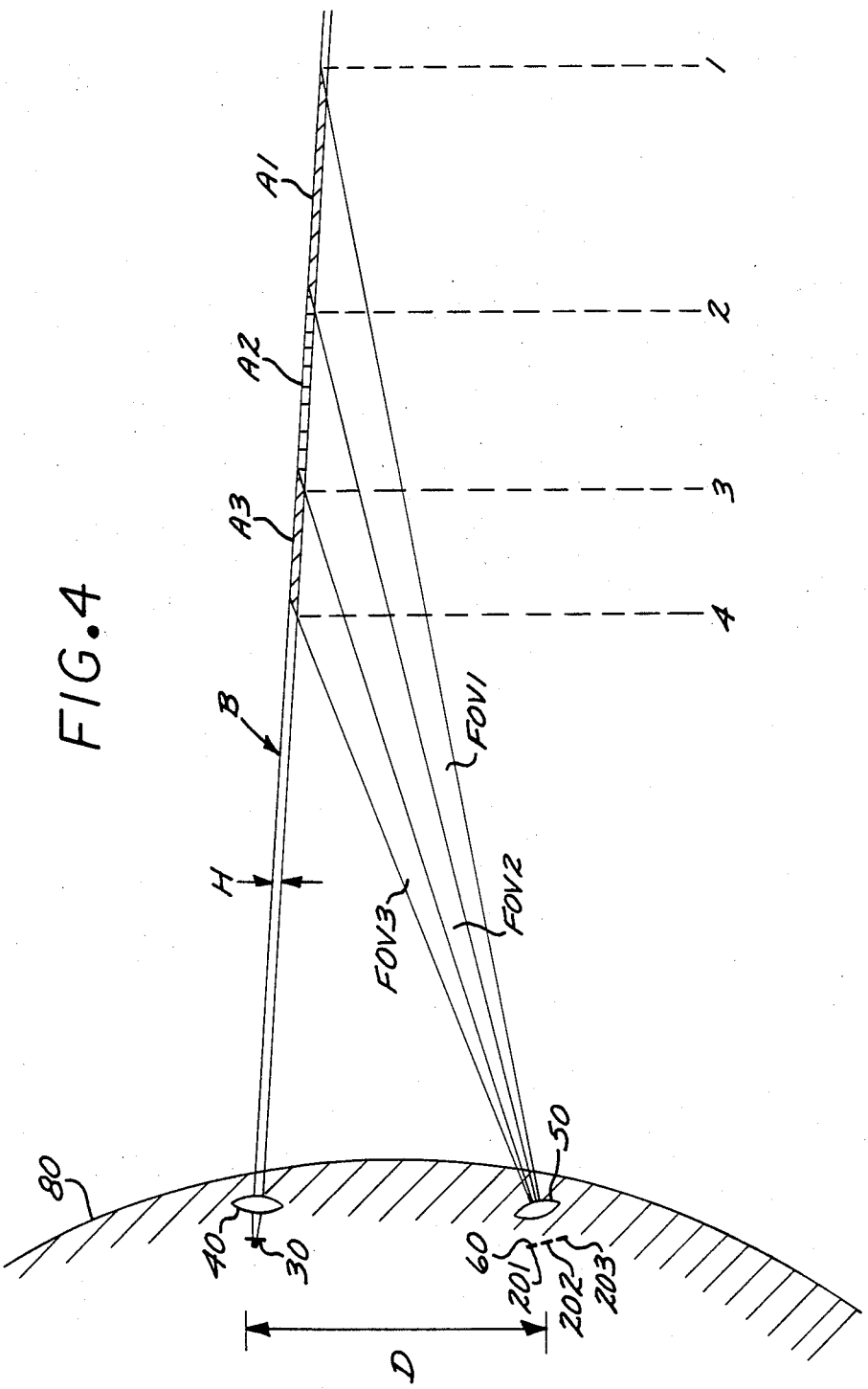
FIG. 4 is a schematic representation of the use of the disclosed optical proximity sensing system having three fields of view.

FIG. 4 provides a schematic illustration of the application of the optical proximity sensing 10 with a detector array 60 having three detector elements. The application of such a sensing system 10 having three detector elements is similar to the application illustrated in FIG. 2, except that the detector array has three detector elements 201, 202, 203 which are closely spaced and linearly aligned from top to bottom relative to the orientation of FIG. 4. The detector 201 is at the top of the array 60, the detector 202 is in the middle, and the detector 203 is at the bottom. The detector 202 is a target detector and the detectors 201, 203 are guard detectors. The center of the detector array is located a distance D from the center of the emanating laser beam B.

The detectors 201, 202, 203 respectively have associated fields of view FOV1, FOV2, FOV3. The respective angular subtenses of the fields of view are controlled by the sizes of the respective detectors and the receive lens system 50. The fields of view are inverted relative to the orientation of the associated detector elements since the receive lens system 50 inverts the image provided to the detector array 60.

The respective intersections of the fields of view FOV1, FOV2, FOV3 with the laser beam B define the respective active regions for the detectors 201, 202, 203. The active region for the guard detector 201 is A1, the active region for the target detector 202 is A2, and the active region for the guard detector 203 is A3.

For the reasons discussed with respect to the two-detector system discussed relative to FIGS. 2 and 3, the detectors 201, 202, 203 may receive weak returns due to transmitter beam B or fields of view FOV1, FOV2, FOV3, sidelobes causing some uncertainty near the edges of the fields of view as to which active area the target is in. However, as in the case of the two-detector system, the general condition will be that a solid target will present a strong return from the active area in which it is located and will primarily reflect the transmitted energy to only one detector. As with the two detector system shown in FIG. 2, the height H of the laser beam B is small and the uncertainty is therefore minimal.

Figure 5:
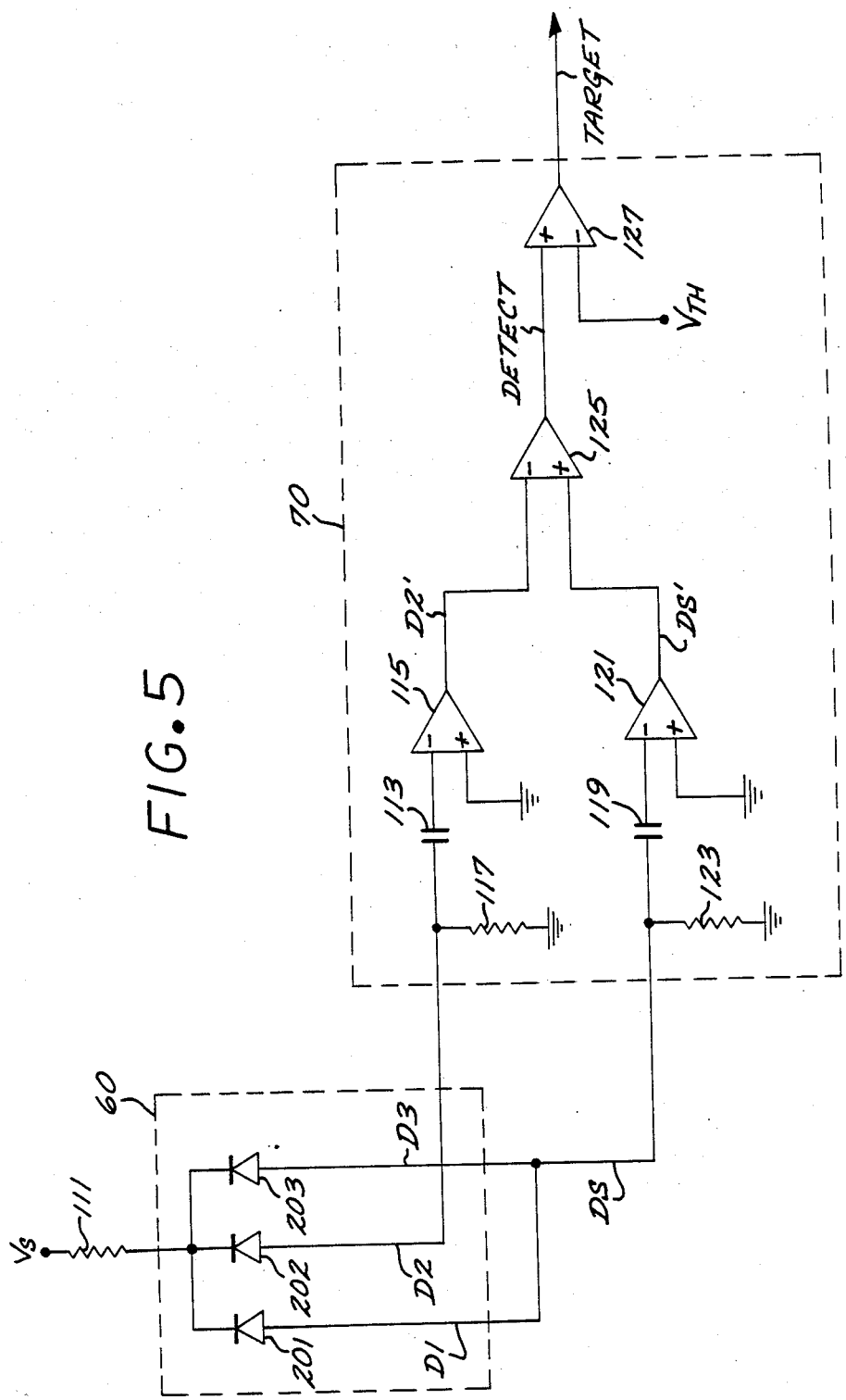
FIG. 5 is a schematic diagram of the detector array and receive processing circuit of the disclosed optical proximity sensing system of FIG. 4.

Referring now to FIG. 5, shown therein is a schematic diagram of the detector array 60 and the receive processing circuit 70 of the optical proximity sensing system 10 of FIG. 1 with a detector array 60 having three detector elements. The schematic diagram of FIG. 5 is similar to the schematic diagram of FIG. 3, except that the detector array includes three detectors 201, 202, 203.

The cathodes of the detectors 201, 202, 203 are connected together to one terminal of a biasing resistor 11 which has its other terminal coupled to a voltage source $V_s$. The anodes of the guard detectors 201, 203 provide detector signals D1, D3 and are connected together to provide a summed detector output DS. The anode of the target detector 202 provides a detector output D2.

The detector output D2 is coupled via an AC coupling capacitor 113 to the inverting input of a transimpedance amplifier 115. The detector output D2 is further provided to one terminal of a load resistor 117 which has its other terminal coupled to ground. The load resistor 117 allows the blocked DC signal to be coupled to ground.

The summed detector output DS is coupled via an AC coupling capacitor 119 to the inverting input of a transimpedance amplifier 121. The summed detector output DS is further provided to one terminal of a load resistor 123 which has its other terminal coupled to ground. The load resistor 123 allows the blocked DC signal to be coupled to ground.

The output of the transimpedance amplifier 115 is provided to the inverting input of a differential amplifier 125 which receives the output of the transimpedance amplifier 121 at its non-inverting input. The output signal provided by the differential amplifier 125 represents the difference between (a) the amplified output of the target detector 202 and (b) the amplified sum of the outputs of the guard detectors 201, 203, and is identified as the signal DETECT. The signal DETECT may be expressed as follows:

$$DETECT = D2' - DS' \qquad \text{(Equation 2)}$$

where D2' is an amplified version of the output D2 provided by the target detector 202, and DS' is the amplified sum of the outputs D1, D3 provided by the guard detectors 201, 203. The signal DETECT provided by the differential amplifier 125 may also be expressed as follows:

$$DETECT = D2' - (D1' + D3') \qquad \text{(Equation 3)}$$

where D1' and D3' are amplified versions of the outputs of the guard detectors 201, 203.

The DETECT signal from the differential amplifier 125 is provided to the non-inverting input of a digital comparator 127. The inverting input of the digital comparator 127 is coupled to a threshold voltage $V_{TH}$. The digital comparator 127 provides an output signal TARGET which has logical levels. A high TARGET signal indicates that the optical sensing system 10 has determined the presence of an object target.

In operation, the TARGET signal goes high only when the DETECT signal exceeds a predetermined threshold $V_{TH}$, which is a positive reference voltage. Since the sum of the outputs of the guard detectors 201, 203 is subtracted from the output of the target detector 202, the DETECT signal will be positive only when the target detector output exceeds the sum of the guard detector outputs by an amount determined by the threshold $V_{TH}$. In essence, the amplified target detector output must exceed the amplified sum of the guard detector outputs plus the predetermined threshold $V_{TH}$.

The sensing system 10 having three detectors 201, 202, 203 functions under different conditions as follows.

Consider first the situation where all three active regions A1, A2, A3 are subject to the same or similar atmospheric conditions. For example, the three active regions may be subject to the presence of aerosol or the absence of aerosol. Under such similar conditions, the absence of a target return to any of the detectors 201, 202, 203 results in a DETECT signal that is zero (no aerosol) or negative (aerosol present) since the amplified sum of the guard detector outputs is subtracted from the amplified target detector output. The TARGET signal therefore remains low.

Further considering the situation where all three active regions are subject to the same or similar atmospheric conditions, the presence of a strong target return to one of the detectors 201, 202, 203 results in the TARGET signal going high only when the strong target return is to the target detector 202. If the strong target return is to either of the guard detectors 201, 203, the resulting DETECT signal becomes negative and therefore the TARGET signal remains low. However, if the strong target return is to the target detector 202, the resulting DETECT signal will be positive and greater than the reference threshold $V_{TH}$. As a result the TARGET signal will go high.

Under the foregoing conditions where all three active regions A1, A2, A3 are subject to the same or similar atmospheric conditions, the optical proximity sensing system 10 with three detector elements is very resistant to false alarms. Such resistance to false alarms results from the subtraction of the amplified sum and the guard detector outputs from the amplified target detector output, which in essence provides for a variable threshold that must be exceeded by the amplified target detector output to allow the TARGET signal to go high. That variable threshold is the sum of (a) the amplified sum of the guard detector outputs and (b) the reference threshold $V_{TH}$.

Referring still to FIG. 4, consider next the condition where an aerosol bank extends from point 2 in the active region A1 (associated with the guard detector 201) to and beyond point 1 at far range. Such condition would be encountered, for example, when the active regions are entering an aerosol bank. Without a strong return to any of the detectors 201, 202, 203, the DETECT signal will be negative since the guard detector 201 is receiving an aerosol return, and the TARGET signal remains low. With a strong target return to either of the guard detectors 201, 203, the DETECT signal will be even more negative and the TARGET signal remains low. With a strong target return to the target detector 202, the DETECT signal will be positive and greater than the reference threshold $V_{TH}$. As a result the TARGET signal will go high.

Under the foregoing condition where an aerosol bank extends from point 2 in the active region A1 to and beyond point 1 at far range, the optical proximity sensing system 10 having three detectors is resistant to false alarms as a result of the variable threshold provided by the outputs of the guard detectors 201, 203.

Consider next the condition where an aerosol bank extends from point 3 in the active region A2 (associated with the target detector 202) to and beyond 1 in the far range. Such condition would be encountered, for example, when the active regions are entering an aerosol bank. Without a strong target return to any of the detectors, the DETECT signal will be close to zero since the guard detector 201 and the target detector 202 are receiving aerosol returns, and the DETECT signal will be less than the reference threshold $V_{TH}$. With a strong target return to the target detector 202, the DETECT signal will be positive and greater than the reference threshold VTH. The TARGET signal will go high. With a strong target return to either of the guard detectors 201, 203, the DETECT signal will be negative and the TARGET signal remains low.

Under the foregoing condition where an aerosol bank extends from the active region A2 to far range, the optical proximity sensing system 10 having three detectors is resistant to false alarms as a result of the variable threshold provided by the outputs of the guard detectors 201, 203.

Consider next the condition where the aerosol bank extends from point 4 near range to point 3 in the active region A3 of the guard detector 203. It should be readily apparent that as a result of the symmetry of having two guard detectors 201, 203 whose outputs are summed, this condition is similar to the condition where the aerosol bank extends to far range from the active region A1 associated with the guard detector 201. Accordingly, the system behaves in the same manner and provides the same resistance to false alarms.

Consider now the condition where the aerosol bank extends from point 4 at near range to point 2 the active region A2 of the target detector. It should be readily apparent that this condition is similar to the condition where the aerosol bank extends to and beyond point 1 at far range from the point 3 in active region A2 associated with the target detector 202. Accordingly, the system behaves in the same manner and provides the same resistance to false alarms.

In addition to the resistance to aerosol related false alarms, the disclosed system provides increased resistance to false alarms due to far range clutter, which may include aerosol that is beyond the active regions of the detectors. Far range clutter would generally provide returns to all of the detectors, the greatest being on the far range guard detector 201, and therefore would not cause the DETECT signal to be sufficiently positive in the absence of a strong target return to a target detector. Again, the variable threshold provided by the guard detectors prevents false alarms.

FIGS. 6A through 6D show the response to fog and to a target as a function of the range from the missile to the fog-clear air boundary, or of the range to the target in several dynamic situations. Curves DS' represent the sum of the outputs of the detectors 201, 203; curves D2' represent the output of the detector 202; and curves DETECT are combined curves representing the differences between D2' and DS'. It should be appreciated that the output from detector 203, when present and summed with the output of detector 201, will result in a DS' curve that is even larger negatively, and so the output of the detector 203 is not separately shown.

FIG. 6A shows the signal D2' and DS' as a function of the location of the edge of fog or cloud bank moving, relatively, from far range toward the vehicle carrying the system. It is seen that the output DS' is caused to go increasingly negative and remain so. Even though the reflection of the cloud bank causes a positive signal to appear on output D2' when the edge of the bank reaches active area A2, the combined signal DETECT always remains negative and therefore a TARGET signal cannot occur.

FIG. 6B shows the combined output DETECT as a function of the location of the edge of a fog or cloud bank as the vehicle carrying the system emerges from the cloud bank. In such a case, the signal DETECT begins at a negative value and goes less negative as the detector 201 "sees" clear air. It then goes more negative again as the positive signal contribution of detector 202 disappears because of no reflection from clear air. Finally, as detector 203 "sees" no reflection from clear air, the combined signal DETECT goes to zero. In such a case the signal DETECT always remains negative and no TARGET signal can occur.

FIG. 6C shows the signals D2', DS' and DETECT for a solid target moving relatively from far range to near range in clear air versus range to the target. Signal DS' goes negative when the target enters active area of detector 201 and remains so until the target leaves. Signal D2' goes positive when the target enters the active area of detector 202 and remains so until the target leaves. DS' goes negative when the target enters the active area of detector 203 and remains so until it leaves. The combined response DS' is seen to show a positive response which would exceed the detection threshold at any place in the active area of detector 202, resulting in a TARGET signal.

FIG. 6D shows the combined response DETECT versus range to the target for a solid target moving relatively from far range to near range while the active areas of the detectors are immersed in fog or clouds. The curve DETECT in FIG. 6D is the sum of the DETECT curve in FIG. 6B and the DETECT curve in FIG. 6C. The response to a solid target and the aerosol reflections show that only the target will generate a signal which exceeds the detection threshold giving a TARGET signal.

While the optical proximity sensing system 10 of the invention has been described in terms of two and three detector implementations, the invention contemplates a detector array having a total of N alternating target and guard detectors, where N is greater than or equal to 2. Where N is even, the optical proximity sensing system 10 would have N/2 guard detectors and N/2 target detectors. Where N is odd, then the system would have (N+1)/2 guard detectors and (N−1)/2 target detectors. The use of multiple target detectors provides for multiple target ranges.

For an optical proximity sensing system where N is even, a target detector would be at one end of the array, and may be subject to false alarms for the reasons discussed above relative to the two detector system.

For an optical proximity sensing system where N is odd, a guard detector would be at each end of the array, and would be resistant to false alarms for the reasons discussed above relative to the three detector system.

In terms of implementation, a generalized N detector optical proximity sensing system 10 in accordance with the invention would include a receive processing circuit 70 substantially similar to the ones respectively shown in FIGS. 3 and 5 for the two detector and three detector systems discussed above. Specifically, for an N detector system, the amplified sum of the guard detector outputs would be subtracted from the amplified sum of the target detector outputs to provide a DETECT signal. The DETECT signal is them compared against a reference threshold. If the DETECT signal exceeds a reference threshold $V_{TH}$, a TARGET signal goes high indicating the detection of a target object. Otherwise, the TARGET signal remains low.

Alternatively, for the generalized N detector optical proximity sensing system 10, an output associated with each target detector may be provided by subtracting the amplified sum of the adjacent guard detectors from such target detector. Of course, where N is even, one of the target detectors will only have one adjacent guard detector.

In addition to protecting against aerosol related false alarms and far range clutter false alarms, the optical proximity sensing system further provides for substantially reduced range differences due to target object reflectance variations. That is, the TARGET signal is turned on or off within a very small increment of range for target objects having different reflectances. Stated another way, the disclosed invention provides for enhanced accuracy of determination of range at the edges of the field of view.

Figure 7A:
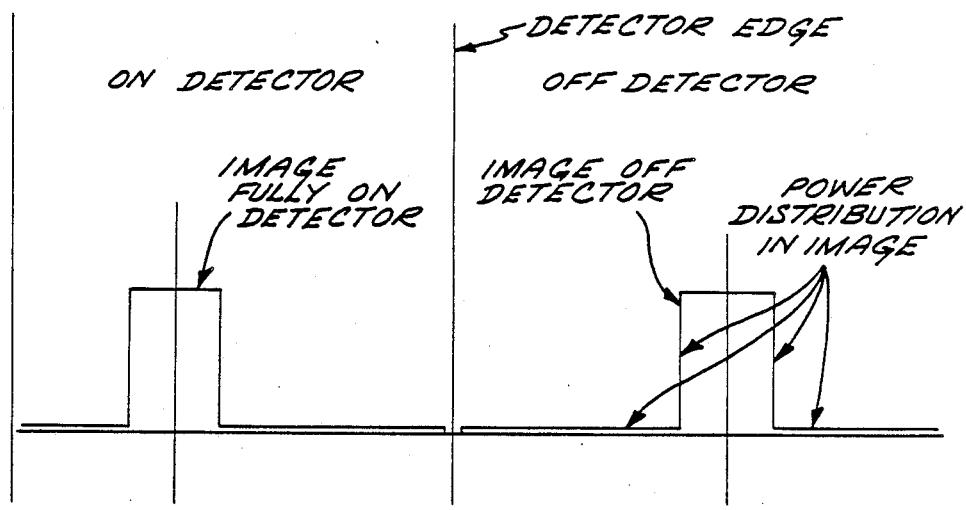
FIGS. 7A and 7B are diagrams illustrating the response of a single detector element to images of different reflectances as a function of position on the detector element.
Figure 7B:
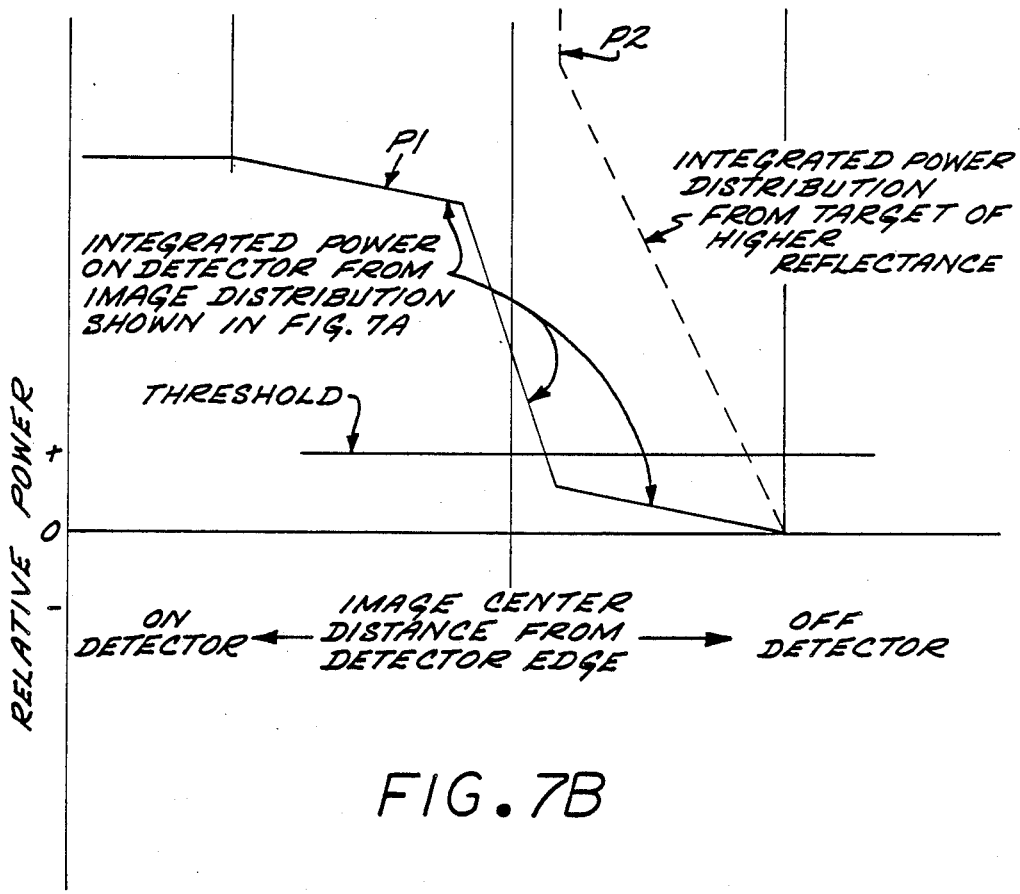

The range edge enhancement provided by the invention can perhaps be better understood by considering a one detector prior art system wherein the output of the sole detector is compared against a fixed reference. Reference to FIGS. 7A-7B will aid in understanding the following discussion. It is well known that all optical images have low-intensity sidelobes. They are produced by diffraction, lens aberration, scattering by optical or mounting elements, or misalignment or focusing errors. An example of a target image power distribution using a simplified rectangular distribution is shown in FIG. 7A. The image is depicted in two positions; just off the surface of a detector, and fully on the surface of a detector. The image is shown having a high concentration of power at its center and low concentration of power in wide sidelobes.

FIG. 7B illustrates the relative power P1 detected by the detector for various positions of the target image on the detector surface. Consider that the image is moved from a position off the detector to a position on the detector. The energy falling on the detector will be proportional to the integrated area of the image distribution within the detector active area.

As the first sidelobe of the image moves onto the detector, the relative power P1 rises slowly in a straight line. As the main concentration of the image moves onto the detector, the relative power P1 rises as a much steeper straight line. Finally, as the second sidelobe moves onto the detector the relative power P1 again rises slowly in a straight line manner until a peak is reached at the point where the image is fully upon the detector.

The location of the target image with respect to the detector depends on range to the target. The target moves toward and then passes the center of the field of view as range is closed. As the target moves in the field of view, the center of the target image moves toward and then passes the center of the detector. Very small changes in the location of the target image represent large changes in range to the target. For example, a change in image position relative to the detector represents a change of range of several thousand times such change in position ΔR.

A difference of range that is implied by a second target image that has much greater power than the first target image is illustrated in FIG. 7B. A target image having a relative image power curve P2 is shown as about 10 times greater power than P1. The target producing the image relative power curve P2 may in fact be at the same range as the target which produces the image relative power curve P1 but would have much higher reflectance. The relative power of the first P2 sidelobe as it moves onto the detector rises much more steeply than P1.

If a threshold T of relative power needed to detect a target is applied, it is easily seen that to be detected by exceeding the threshold T, the more powerful target image P2 must move only a fraction of the distance closer to the center of the detector than image P1 must move. This means that a target producing the higher relative image power P2 will be detected at a much greater range than the target producing the lesser relative image power P1.

In the disclosed optical proximity sensing system 10, such range variation is substantially reduced as a result of the one or more guard detectors which effectively provide for a variable threshold. This is further illustrated as follows.

Consider two adjacent detectors such as detectors 101, 102 in FIG. 2. Further consider that active area A1 is associated with a guard detector 101 and that active area A2 is associated with a target detector 102. The outputs from each of the two detectors 101, 102 are "differenced"; that is, detector 101 output is given a negative value and detector 102 output is given a positive value. The respective outputs are then summed.

Figure 8:
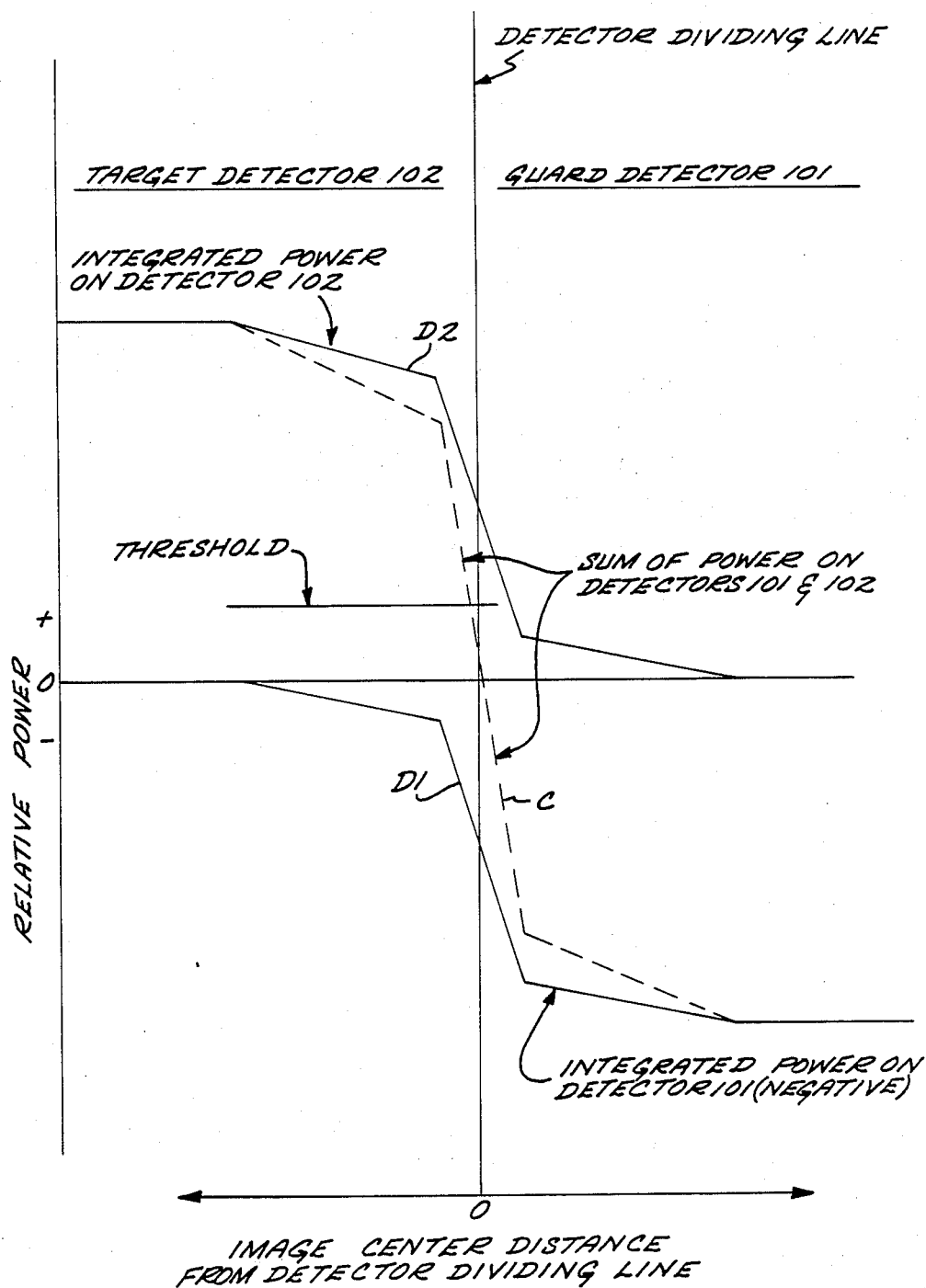
FIG. 8 is a set of curves illustrating the responses of certain detector elements of the system of FIG. 2 to objects of different reflectances.

As a target moves from the active area A1 into active area A2, the target will be detected at essentially the same range irrespective of its reflectance. This is illustrated in FIG. 8. FIG. 8 depicts the relative power at the detectors 101, 102 versus distance from the target image center to the detectors. Curve D1' is the relative output of detector 101. Curve D1' is the relative output of detector 102. Curve C is the sum of curves D1' and D2'.

Initially, as the target image moves away from the center of the guard detector 101 and toward the center of the target detector 102, detector 101 output D1' is at full negative output. Detector 102 output D2' is at zero output. As the target first sidelobe falls upon detector 102, output D2' begins rising to positive values. At the same time, output D1' is becoming less negative. The combined signal DETECT goes from a steady negative value through a sharp rise to a steady positive value.

Irrespective of the power of the image on each detector 101, 102 the detection threshold will be exceeded only when the target image is at about the same distance from the dividing line between detectors 101, 102. This is because the output from detectors 101, 102 are differenced. Since the distance from the detector edge to the position of the image where the threshold T is exceeded does not substantially change with target image power, the range to the target at detection will not vary substantially with target image power and hence target reflectance.

Some of the features of the operation of the invention are therefore seen to be: (1) The target is detected when the image is centered approximately on the margin between detector 101 and 102; (2) detection occurs on the steepest slope of the combined signal DETECT; (3) the target range change from detection to full target detector 102 output is one-half that obtained with a single detector; (4) the maximum slope of the combined signal DETECT is twice as steep as for a single detector output; (5) compared with the single detector of FIG. 7, and for the same conditions of threshold T and image power distribution, the range difference at detection for a given target reflectance versus one of ten times greater reflectance, is but a small fraction of the single-detector difference.

The operation of this invention just described also reduces false alarms caused by strong reflections from a specular surface at long range.

Although the disclosed proximity sensing system has been discussed in terms of a laser pencil beam as an optical transmit signal, the disclosed proximity sensing system may utilize a fan beam which fans out, for example above and below the plane of FIG. 2, with distance from the missile 80. The fields of view associated with the detectors would also be fan shaped.

Further, the disclosed proximity sensing system may utilize electromagnetic radiation other than laser radiation as the optical transmit signal.

In summary, the foregoing has been a disclosure of a proximity sensing system which advantageously prevents false alarms for atmospheric conditions including the presence of aerosol, prevents false alarms due to far range clutter, and provides for increased range sensing that is minimally affected by target reflectance variation.

Although the foregoing has been a description and illustration of specific embodiments of the invention, various modifications and changes thereto can be made by persons skilled in the art without departing from the scope and spirit of the invention as defined by the following claims.

What is claimed is:

1. A proximity sensing system comprising: transmitting means for transmitting electromagnetic radiation;
   a plurality of detector elements having respective adjacent fields of view and respective active where said fields of view intersect said electromagnetic radiation, said detector elements providing respective detector outputs in response to returns within said respective active regions; and
   processing means responsive to said detector outputs for providing a solid object target detection signal when the sum of a first group of said detector outputs exceeds the sum of a second group of said detector outputs by a predetermined amount.

2. The proximity sensing system of claim 1 wherein said electromagnetic radiation is laser radiation.

3. The proximity sensing system of claim 1 wherein said detector elements are linearly arranged with the detector elements of said first group alternating with the detector elements of said second group.

4. The proximity sensing system of claim 3 wherein said first group of detector elements comprises target detectors having detector outputs for indicating returns from a solid onject target and said secnd group of detector elements comprises guard detectors having detector outputs for indicating non-solid object target returns.

5. The proximity sensing system of claim 4 wherein said first group of detector elements includes one target detector, and wherein said second group of detector elements includes one guard detector.

6. The proximity sensing system of claim 4 wherein said first and second groups of detector elements have the same number of detectors.

7. The proximity sensing system of claim 4 wherein said second group of detector elements has one more detector element than said first group of detector elements.

8. The proximity sensing system of claim 1 wherein said processing means comprises:
   means for subtracting the sum of the detector outputs of said second group from the sum of the detector outputs of said first group to provide a detector difference signal; and
   means for comparing said detector difference signal with a predetermined reference.

9. The proximity sensing system of claim 8 wherein said subtracting means includes a differential amplifier, and wherein said comparing means includes a voltage comparator.

10. A method of sensing the proximity of an object target comprising the steps of:
   (a) defining active regions in adjacent fields of view of a plurality of detector elements by projecting a beam of electromagnetic radiation to intersect with said fields of view; and
   (b) processing any output from a first group of detector elements and any output from a second group of detector elements responsive to said beam reflected to said detectors so that a target signal is provided when the sum of the signals from the first group exceeds the sum of the signals from the second group by a predetermined amount;
   whereby a solid object target within an active area will be detected and a false target from aerosols in the atmosphere will not be detected.

11. The method of claim 10 wherein the processing of said output includes:
   (a) making any output from the first group of detectors positive with respect to a threshold reference;
   (b) making any output from the second group of detectors negative with respect to a threshold reference; and
   (c) summing said positive and negative outputs in a differential amplifier and presenting the summed signals to a digital comparator for comparison to a predetermined detection threshold;
   a signal exceeding said detection threshold being regarded as a solid object target.

12. The method of claim 10 wherein said electromagnetic radiation is laser radiation.

13. The method of claim 11 wherein said processing of first group detector elements is performed on target detectors having detector outputs for indicating returns from a solid object target and said processing of second group detector elements is performed on guard detectors having detector outputs for indicating non-solid object target returns.

14. The method of claim 13 wherein the number of target detectors includes one target detector and the number of guard detectors includes one guard detector.

15. The method of claim 13 wherein the number of target detectors equals the number of guard detectors.

16. The method of claim 13 wherein the number of guard detectors is one more than the number of target detectors.

* * * * *